United States Patent [19]

Singleton

[11] 3,959,206

[45] May 25, 1976

[54] HIGH MOLECULAR WEIGHT BUTADIENE-STYRENE LATEX CAN END SEALANT COMPOSITION

[75] Inventor: Henry M. Singleton, Dallas, Tex.

[73] Assignee: The Southland Corporation, Dallas, Tex.

[22] Filed: Oct. 21, 1974

[21] Appl. No.: 516,811

[52] U.S. Cl. .............................. 260/29.6 RW; 260/8; 260/29.6 R; 260/29.6 S; 260/29.6 MM; 260/29.6 MH; 260/29.7 R; 260/29.7 GP; 260/29.7 S
[51] Int. Cl.$^2$............................................ C08L 9/08
[58] Field of Search .......... 260/8, 29.6 R, 29.6 RW, 260/29.6 GP, 29.6 S, 29.6 MH, 29.7 GP, 29.7 R, 29.7 S

[56] References Cited
UNITED STATES PATENTS

| | | | |
|---|---|---|---|
| 2,955,097 | 10/1960 | White | 260/33.6 |
| 3,122,518 | 2/1964 | Logemann | 260/42.55 |
| 3,441,525 | 4/1969 | Kern et al. | 260/42.55 |
| 3,509,082 | 4/1970 | Mays | 260/29.7 |

FOREIGN PATENTS OR APPLICATIONS

| | | | |
|---|---|---|---|
| 1,128,212 | 9/1968 | United Kingdom | 260/29.7 GP |
| 794,837 | 5/1958 | United Kingdom | 260/29.7 GP |

*Primary Examiner*—Donald E. Czaja
*Assistant Examiner*—Edward Woodberry
*Attorney, Agent, or Firm*—Cushman, Darby & Cushman

[57] ABSTRACT

Aqueous can end sealant compositions substantially free from volatile organic solvents, setable at ambient temperatures and based upon relatively high molecular weight SBR latices are disclosed. The compositions are virtually free from the discharge of dangerous volatile organic solvents during the period of setting, yet become solid at ambient temperatures and are suitable for can formation by double sealing, particularly aerosol cans to contain food or non-food products.

12 Claims, No Drawings

HIGH MOLECULAR WEIGHT BUTADIENE-STYRENE LATEX CAN END SEALANT COMPOSITION

BACKGROUND OF THE INVENTION

This invention pertains to a sealant composition adapted to be used in sealing a can end to a can body of the type used for beverages, fruits, vegetables. aerosol cans, and a variety of commercial products, such as paints and automotive specialties. The attachment of ends to can bodies, either the drawn and ironed 2-piece cans or the 3-piece cans where ends are placed on each end of a cylinder, is well known in the art by an operation known as double seaming. The sealant is placed in the trough of a can end and attached to the can end by spinning an end under a fixed nozzle carrying a liquid sealant composition. Before the ends can be used, the liquid composition must "set" to a solid by either a change in temperature or by removal of volatiles.

Generally, the choice of a particular sealant composition can depend on the nature of the product to be packaged, although for the most part, all such sealant compositions are based on rubber dispersions compounded for performance on high speed equipment. Usually sealant compositions for can ends are classified into two groups, i.e. (1) water-based dispersions and (2) volatile organic-based rubber dispersions, the latter often being subdivided into: (a) those which are water resistant and are utilized in the packaging of fruits, vegetables, beverages and certain pet foods, and (b) those which are oil-resistant and are employed in the packaging of fish, poultry, soups and other meat products.

I have observed that can ends lined with a water-based rubber dispersion sealant composition are generally subjected to a separate drying operation to remove the water, whereas can ends lined with a volatile organic solvent-based dispersion sealant composition generally dry by themselves through the evaporation of the volatile solvents component while being stored in a work area or in a warehouse prior to their use.

Thus, while can ends lined with a volatile organic solvent-based rubber dispersion sealant composition provide an advantage over water-based compositions in that a separate drying operation may not be required; nonetheless, the use of volatile organic solvent-based compositions suffers from the disadvantage that the evaporation of large volumes of volatile organic solvents into populated areas where can plants are typically located causes undesirable air pollution as well as fire and health hazards. For example, in a typical daily operation, approximately 600 drums of such volatile organic solvent-based sealant compositions are employed, the average solvent content thereof being about sixty percent.

More specifically, one extensively employed volatile organic solvent-based rubber dispersion sealant composition is a hexane dispersion of SBR and/or butyl rubber, compounded with inert fillers, colors, aging stabilizers, viscosity stabilizers, and food grade antioxidants. The total solids content of such a sealant composition is about forty percent, the remainder being the volatile solvents component.

The use of this particular sealant composition can thus amount to about 19,800 gallons of volatile organic solvent per day, or just under five million gallons per year based on a 250 day work year, being exhausted to the surrounding atmosphere. Obviously, any significant reduction in the emission of such organic solvents to the environment is highly desirable. I have found that the use of the sealant composition of the present invention achieves this desideratum.

DETAILED DESCRIPTION OF THE PRESENT INVENTION

In accordance with the present invention there is provided a sealant composition that has no flammable or objectionable solvents to emit and does not require oven drying. Basically, the novel composition is a water-based compound, high enough in solids to permit air drying in no more time than is normally required of solvent-based systems. This sealant, therefore, combines the best features of both of the two types of systems with none of the drawbacks of either system as indicated in the foregoing discussion. The gum rubber residue in the dried sealant will hold virtually everything packed in metal cans seamed by the double seaming process while at the same time no vulcanization or toughening agent is required. An important feature of the present sealant compositions as described herein is in the choice of rubber included in the composition.

The rubber component used herein is a copolymer of styrene and butadiene in emulsion or latex form, commonly known as SBR. Polymerization is by the cold process, i.e. at a temperature of 40° to 45°F. so that the molecular weight can be extended in the high polymer range that is necessary for the compositions of the present invention. There is in the art some disagreement as to exact molecular weights of high polymers depending on the measurement methods used, however as used herein, this property is referred to as a function of the Mooney viscosity (large rotor) of the solid polymer referred to herein as Mooney (ML) at 212°F. This is a standard test method well known in the art and employed in the testing of dry rubbers of all kinds. A detailed discussion of SBR rubbers, including their physical and chemical properties, is in the Encyclopedia of Polymer Science & Technology, vol. 5, pages 406–426, the disclosure of which is hereby incorporated by reference.

The sealant composition of the present invention, air-dryable and substantially or completely free from flammable or objectionable solvents, includes the following components, all expressed in parts by weight unless otherwise indicated.

a. from 25 to 35% of a 70% styrene-butadiene rubber (SBR) latex having a Mooney (ML) viscosity of 100 to 150, preferably about 140, and a bound styrene content of the order of 20–30, preferably about 23%.

b. A wetting agent is typically included in an amount and of the type such that the resulting composition assumes a substantially flat configuration on lubricated metal surfaces. Ionics of the alkyl aryl sulfates and sulfonates, typically as the sodium or potassium salts thereof, containing one alkyl group having from 4 to 30 carbon atoms disposed in a long chain. Examples include dodecyl benzene sodium sulfonate, octyl naphthalene sodium solfonate, monobutyl phenyl-phenol sodium sulfonate and the like. Suitable wetting agents may be selected from those disclosed in column 4, lines 8-71 of U.S. Pat. No. 2,629,698. In addition, various other wetting agents are included among the listing in McCutcheon's Detergents and Emulsifiers, 1970 Annual; the disclosures of these publications are hereby incorporated by reference. Preferably the wetting agent is an FDA-accepted material approved for contact with wet, dry or oily foods. I prefer to use as the wetting agent from 3 to 5% of a 30% solution of sodium alkyl aryl sulfate such as Aquarex, WAQ, a material obtained from E. I. DuPont and Company.

c. Fillers are typically included in the composition with a maximum particle size of the order of about 2 microns in diameter. Suitable fillers include aluminum silicate, calcium carbonate and magnesium silicate while titanium dioxide and lamp black may also be incorporated for the coloring properties as well. Preferably a major portion or all of the filler, i.e. 35 to 65%, is aluminum silicate which is of particular value for it has a flat plate-like structure. Fillers reactive with the SBR, such as magnesium oxide and zinc oxide, are not preferred and in most cases are to be avoided.

d. FDA approved and accepted food grade antioxidants for the SBR rubber are included in a sufficient antioxidizing amount which is generally from 0.1 to 1%, or even up to as much as 2% depending upon the SBR rubber. Preferred materials include butylated hydroxy toluene, butylated hydroxy anisole and styrenated butylated paracresol e. Thickness of the composition is adjusted with a neutralized salt of a polyacrylic acid such as methyl methacrylate typically included in an amount of from 0.2 to about 1.0%, usually in the form of dispersion, i.e. a 40% dispersion of polyacrylic acid.

f. Other formulating adjuncts customarily used in the art are included in the composition of the present invention. Such materials include defoamers, colors for identification, emulsion stabilizers and coalescing agents all as required for optimum functioning of the sealant composition. Specific materials contemplated include methyl laurate (0.2 – 1.0%) as a defoamer and one or more hydrocarbon resins, typically supplied in the form of a dispersion, having a melting point in the range of 50° to 150°C., preferably about 90° to 100°C. Polyisoprene having a melting point of about 100°C. is suitable.

There are several overall requirements for the sealing compositions of the present invention. For instance, the stability of the system must be such that no build up of the sealant as it is applied from a fixed nozzle to the can ends at rates of up to 500 ends per minute.

When possible, all components of the sealant are of the "food grade" type, that is approved by the Food and Drug Administration for direct contact with wet, dry or oily foods. This permits interchangeability of the contents of the can so filled; for example, filling cans may be conveniently changed from a non-food item, such as paint or hairspray, to a food item without changing the container supply line or sealant.

In operation, the average drying time of the novel sealant compositions disclosed herein varies depending upon several factors including the specific formulation of the sealing composition, humidity, air currents and ambient temperatures surrounding the can ends prior to sealing. At ambient temperatures drying, that is the sealant is sufficiently "set" for completion of the can and sealing, is generally complete in no more than about two days. When it is desirable to accelerate drying, hot air currents reduce the time to a matter of 30 seconds or less, possibly as low as 15 to 20 seconds. Of course the average dry or "set" time is adjusted to suit the needs of the sealant user.

The pH of the final composition is generally on the basic side and usually within the range of 8.0 to 10.0. This value is adjusted by adding the requisite quantity of acid or base, usually a base, to the formulation. A suitable base is diethylamine, about 0.3 to 0.7%.

The resulting composition is a highsolids water-based material useful particularly as an end sealant for aerosols of oil or water-based food and non-food products. By virtue of selecting the appropriate SBR rubber very high in Mooney viscosity, the resulting product provides a non-crosslinked gum rubber sealant.

Physical properties of a typical formulation are as follows:

| | |
|---|---|
| Solvent | Water |
| Appearance, Wet | Dark Gray |
| Appearance, Dry | Dark Gray |
| Solids, Wt. % | 65.0 ± 1.0 |
| Ash, Wt. % | 46.55 |
| Sp. Gr. Wet | 1.306 |
| Sp. Gr. Dry (Calc.) | 1.474 |
| Viscosity Brookfield, LVF at 30 rpm | 3320 cps |
| No. 3 Spindle (Typical) 12 rpm | 6500 cps |

As used herein the term ambient temperature relates to temperatures of the order of 65°–95°F, that is temperatures at which the sealant compositions of the present invention may be subjected to during and up to a few days after application to the end portion of the can until such time as the composition has substantially solidified.

When present, each component of the novel compositions described herein is present in the amount of at least about 0.1%.

A typical working example of this composition is as follows:

| | Parts by Weight |
|---|---|
| SBR Latex (70% solids) | 28.00 |
| Water | 24.40 |
| Tetra Potassium Pyrophosphate | 0.10 |
| Methyl laurate | 0.50 |
| Aluminum Silicate (Kaolin) | 36.00 |
| Titanium Dioxide (Rutile) | 4.10 |
| Lamp black | 0.35 |
| Calcium carbonate | 6.00 |
| 45% Potassium hydroxide | 0.15 |
| 15% solution of ammonium casein | 2.50 |
| Diethyl amine | 0.40 |
| Butylated Styrenated para cresol | 0.20 |
| Hydrocarbon resin emulsion (50% solids) | 5.00 |
| Mixed sodium aryl alkyl sulfates (30%) | 3.00 |
| Polymethylmethacrylate resin acid | 0.50 |
| Total | 115.20 |

I claim:

1. An aqueous based, substantially volatile organic solvent-free can-sealing composition setable at ambient temperatures and consisting essentially, in addition to the aqueous vehicle, expressed in parts by weight of:
   a. about 17.5 to about 24.5 parts of high molecular weight styrene-butadiene rubber (SBR) having a Mooney (ML) viscosity at 212°F of 100-150 and a bound styrene content of 20-30%,
   b. about 35 to about 55 parts of an inert filler having a particle size of at most about 2 microns and selected from the group consisting of calcium carbonate, titanium dioxide, aluminum silicate, magnesium silicate, lamp black and mixtures thereof;
   c. 0.1 to about 2.0 parts antioxidant for said SBR, said antioxidant selected from the group consisting of butylated hydroxy anisole, styrenated butylated paracresol and butylated hydroxy toluene;

d. about 0.9 to about 1.5 parts of an anionic wetting agent, and e. from 0.08 to about 0.4 parts of a polyacrylic acid salt as thickening agent, said sealant composition adjusted to an overall pH in the range of about 8.0 to about 10.0.

2. The sealant composition as claimed in claim 1, wherein the inert filler includes 35–40 parts aluminum silicate, 0–15 parts calcium carbonate and 3–8 parts titanium oxide.

3. The sealant composition as claimed in claim 1, wherein the wetting agent is sodium alkyl aryl sulfate.

4. The sealant composition as claimed in claim 1, additionally including 0.08–0.4 parts of polyacrylic acid.

5. The sealant composition as claimed in claim 1, additionally including 1.5–10 parts of a hydrocarbon resin dispersion, said resin having a melting point in the range of 50°–150°C.

6. The sealant composition as claimed in claim 1, wherein the SBR has a Mooney (ML) viscosity of 130 and a bound styrene content of 23%.

7. The sealant composition as claimed in claim 1, wherein the filler consists entirely of aluminum silicate.

8. The sealant composition as claimed in claim 1, wherein part (c) is butylated hydroxy anisole.

9. The sealant composition as claimed in claim 1, wherein part (c) is butylated para cresole.

10. The sealent composition as claimed in claim 1 wherein from 35 to 65% of the inert filler is aluminum silicate.

11. The sealant composition as claimed in claim 1 wherein part (c) is butylated hydroxy toluene.

12. An aqueous based can sealant composition setable at ambient temperatures and substantially devoid of volatile organic solvent, consisting essentially, in parts by weight, of:

a. about 17.5–24.5 parts of SBR having a Mooney (ML) viscosity at 212°F of 100 to 150 and bound styrene content of 20–30%;

b. about 35 - 40 parts aluminum silicate filler having a maximum particle size of 2 microns;

c. 0 - 15 parts calcium carbonate as filler having a maximum particle size of 2 microns;

d. 0.1 – 1.0 parts of an antioxidant selected from the group consisting of butylated hydroxy anisole, styrenated butylated paracresol, butylated hydroxy toluene and mixtures thereof;

e. about 3 – 8 parts of titanium dioxide;

f. about 0.25 – 1.0 parts lamp black;

g. about 0.9–1.5 parts of sodium aryl alkyl sulfate surfactant;

h. about 0.2 – 1.0 parts methyl laurate;

i. about 0.08–0.4 parts of a polyacrylic acid thickening agent;

j. about 0.75–5 parts of a hydrocarbon resin, said hydrocarbon resin having a miminum melting point of solid resin of 90°C; and k. about 0.3 – 0.7 parts of diethylamine as required to adjust the pH of the composition of the range of 8.0 –10.0.

* * * * *